(12) United States Patent
Buchanan

(10) Patent No.: US 11,192,225 B2
(45) Date of Patent: Dec. 7, 2021

(54) RETAINER REMOVAL TOOL

(71) Applicant: Honda Motor Co., Ltd., Tokyo (JP)

(72) Inventor: Matthew J. Buchanan, Kenton, OH (US)

(73) Assignee: Honda Motor Co., Ltd., Tokyo (JP)

( * ) Notice: Subject to any disclaimer, the term of this patent is extended or adjusted under 35 U.S.C. 154(b) by 176 days.

(21) Appl. No.: 16/269,807

(22) Filed: Feb. 7, 2019

(65) Prior Publication Data

US 2020/0254598 A1 Aug. 13, 2020

(51) Int. Cl.
*B25B 27/00* (2006.01)
*B25B 27/14* (2006.01)
*B60N 3/04* (2006.01)

(52) U.S. Cl.
CPC .......... *B25B 27/14* (2013.01); *B25B 27/0035* (2013.01); *B60N 3/046* (2013.01); *B60N 3/044* (2013.01)

(58) Field of Classification Search
CPC ........... B25B 3/00; B25B 15/00; B25B 21/00; B25B 23/00; B25B 17/00; B25B 31/00; B23P 19/00; B23P 19/04; B23P 19/10
See application file for complete search history.

(56) References Cited

U.S. PATENT DOCUMENTS

| 3,861,249 A * | 1/1975 | Lindquist | B25B 27/24 81/15.4 |
| 4,736,658 A * | 4/1988 | Jore | B25B 23/12 81/451 |
| 4,762,437 A | 8/1988 | Mitomi | |
| 4,942,655 A * | 7/1990 | Buzzelli | B25B 27/20 29/229 |
| 5,265,504 A * | 11/1993 | Fruhm | B25G 1/085 81/177.4 |
| 5,695,307 A | 12/1997 | Takahashi | |
| 5,819,611 A | 10/1998 | Kozak | |
| 6,047,620 A | 4/2000 | Kozak et al. | |
| 7,908,723 B1 * | 3/2011 | Kodi | E04C 5/163 29/243.56 |
| 8,490,262 B2 * | 7/2013 | Monyak | E21C 35/197 29/243.56 |
| 9,568,299 B2 | 2/2017 | Rhee | |
| 2020/0254598 A1 * | 8/2020 | Buchanan | B25B 27/14 |

FOREIGN PATENT DOCUMENTS

| DE | 102006053623 A1 | 5/2008 |
| GB | 1304219 A | 1/1973 |
| KR | 101886508 A | 3/2018 |

* cited by examiner

*Primary Examiner* — Lee D Wilson
(74) *Attorney, Agent, or Firm* — American Honda Motor Co., Inc.; Morgan Lincoln

(57) ABSTRACT

A retainer removal tool for a carpet retainer of a vehicle includes a shaft portion and a handle portion. The shaft portion has a cylindrical shape and includes an engagement tip has a hollow cylindrical shape and is configured to depress a tab of the retainer in a radially inward direction to decouple an upper retainer from a lower retainer. Further, a method for removing a carpet retainer of a vehicle includes centering a retainer removal tool over the retainer, depressing the retainer removal tool onto the retainer, disengaging a tab of the retainer with the retainer removal tool, and removing the retainer from the carpet.

7 Claims, 8 Drawing Sheets

RETAINER REMOVAL TOOL

BACKGROUND

Automobiles often include carpeting to cover panels and various components, such as electrical control units (ECUs) or wire looms for example, disposed in an interior cabin of the vehicle. The carpet provides improved aesthetics that may appeal to passengers riding in the vehicle. The carpet may be coupled to a panel of the vehicle using a variety of fastening methods, such as a bolt, adhesive, or a mechanical clip, for example.

An example of a mechanical clip is a carpet retainer, often simply referred to as a retainer. The retainer may include two parts, an upper retainer and a lower retainer. In a known embodiment, the lower retainer couples to the vehicle panel; the carpet sits adjacent the lower retainer; and the upper retainer couples to the lower retainer adjacent an opposite surface of the carpet. In this configuration, the carpet is disposed between the upper retainer and the lower retainer as the lower retainer is coupled to the vehicle panel. As a result, the carpet is also coupled to the vehicle panel.

It is often beneficial to remove the carpet from the vehicle panel, such as to service one of the various components disposed thereunder or to replace the carpet itself, for example. However, in known embodiments the retainer may not be configured to allow for easy removal of the carpet without damaging the retainer. More specifically, the upper retainer may not be configured to allow for easy decoupling from the lower retainer to release the carpet disposed therebetween.

A known method for decoupling the upper retainer from the lower retainer includes using a pointed tool, such as a screwdriver for example, to disengage a tab coupling the upper retainer to the lower retainer. This decoupling method is time consuming and may damage the retainer in the process since the tool often used is not specifically designed for this application. As such, there is a desire for a tool specifically designed for efficient removal of the retainer; and more specifically, a tool to aid in the removal of the upper retainer from the lower retainer to allow removal of the carpet from the vehicle panel.

BRIEF SUMMARY

According to one aspect, a retainer removal tool includes a shaft portion and a handle portion. The shaft portion includes a cylindrical shape and an engagement tip that has a hollow cylindrical shape and is configured to depress a tab of a retainer in a radially inward direction. The handle portion includes a plastic material.

According to another aspect, a carpet retainer system for a vehicle includes a retainer, a retainer removal tool, and a clip tool. The retainer includes an upper retainer and a lower retainer. The retainer removal tool includes a shaft portion and a handle portion.

According to another aspect, a method for removing a carpet retainer of a vehicle includes centering a retainer removal tool over the retainer, depressing the retainer removal tool onto the retainer, disengaging a tab of the retainer with the retainer removal tool, and removing the retainer from the carpet.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

With reference now to the figures wherein the illustrations are for purposes of illustrating one or more exemplary embodiments and not for purposes of limiting the same, there is shown a retainer removal tool.

Figure 1:
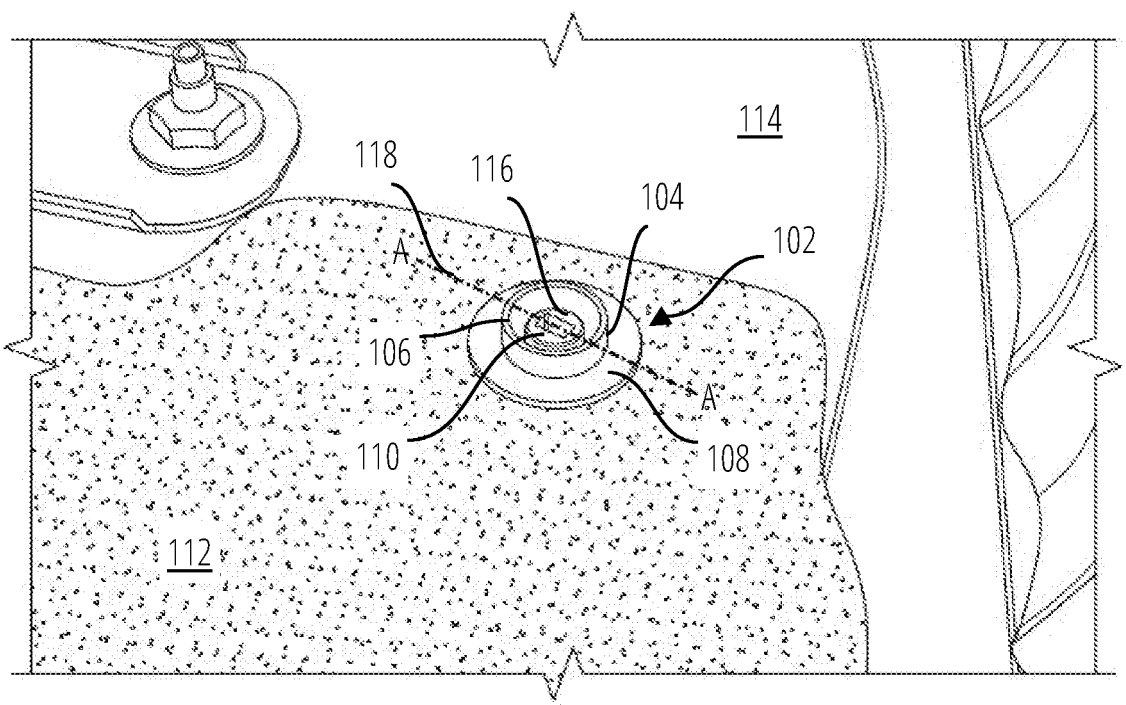
FIG. 1 is a perspective view of a retainer fastening a carpet to a vehicle panel in an exemplary environment.

FIG. 1 is a perspective view of a retainer 102 fastening a carpet 112 to a vehicle panel 114 in an exemplary environment. The exemplary environment may be, for example, an interior compartment of a vehicle where passengers and/or items are secured for transport. The retainer 102 includes an upper retainer 104 and a lower retainer 110. The retainer 102, and more specifically the lower retainer 110, may couple to the vehicle panel 114. The upper retainer 104 couples to the lower retainer 110. The carpet 112 is disposed between an upper flange 108 of the upper retainer 104 and a lower flange 204 (shown in FIG. 2) of the lower retainer 110.

Each of the upper flange 108 and the lower flange 204 has a disc-shape and extends radially outward from a perimeter of a substantially cylindrical body of each of the upper retainer 104 and the lower retainer 110, respectively. Specifically, with respect to the upper retainer 104, a cylindrical portion 106 defines the cylindrical body; and with respect to the lower retainer 110, a center body 116 defines the cylindrical body. As depicted in FIG. 1, the center body 116 is disposed within the cylindrical portion 106 when the upper retainer 104 is coupled to the lower retainer 110. Each of the upper retainer 104 and the lower retainer 110 may be formed from a plastic material.

Figure 2:
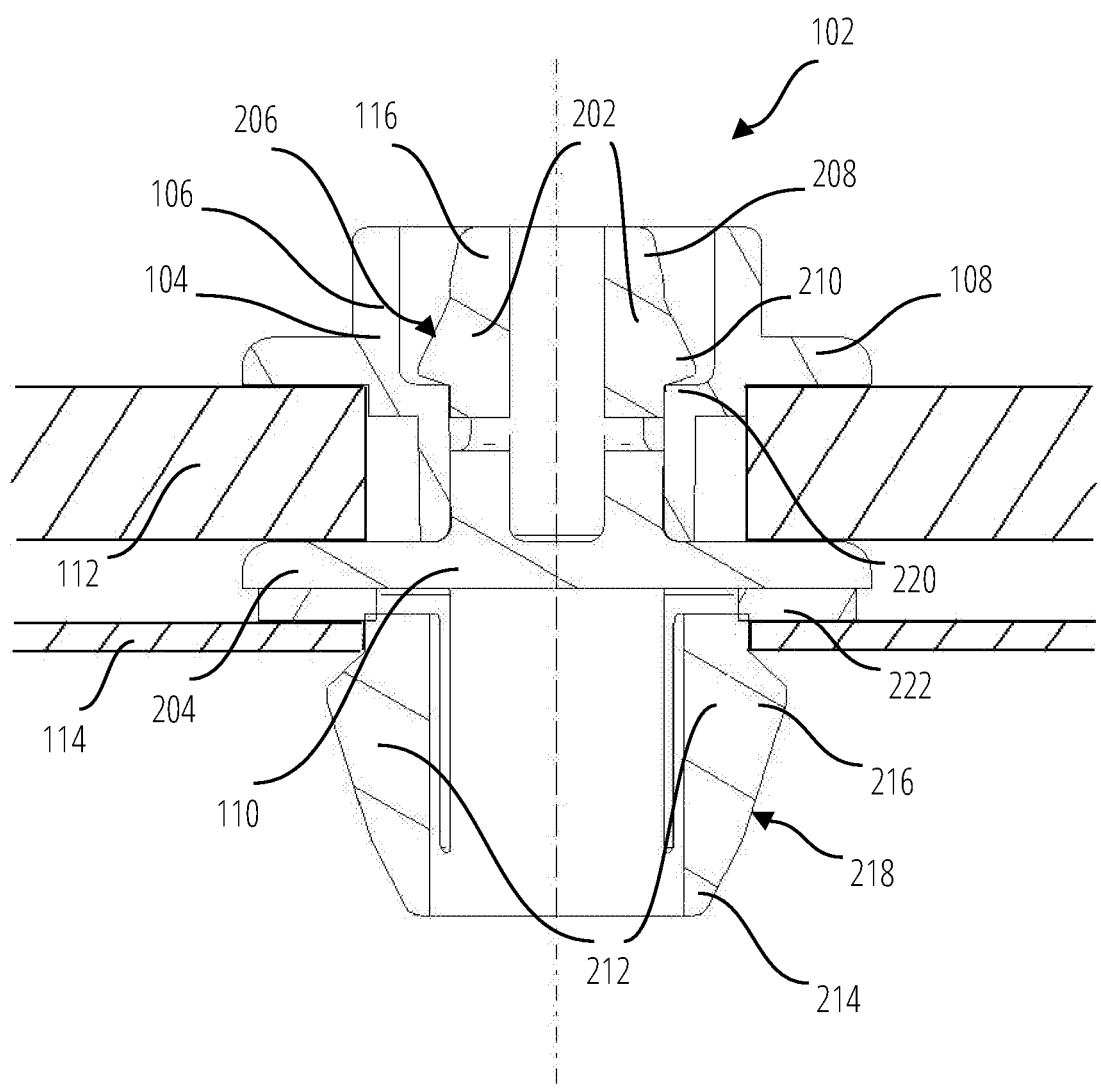
FIG. 2 is a sectional view of the retainer fastening the carpet to the vehicle panel as provided in FIG. 1.

FIG. 2 is a sectional view of the retainer 102 fastening the carpet 112 to the vehicle panel 114 as provided in FIG. 1. The sectional view is taken along line A-A 118 shown in FIG. 1. The lower retainer 110 further includes at least one tab 202 disposed on an outer radius of the center body 116. Two of the tabs 202 are included in the depicted embodiment, however other embodiments may include a different number (e.g., one tab 202). The tab has a wedge shape and includes a narrow end 208 at one end and a wide end 210 at an opposite end with a sloped surface 206 extending therebetween. The tab 202 is coupled to the lower retainer 110 at the narrow end 208. More specifically, the narrow end 208 is formed as part of the lower retainer 110. The wide end 210 protrudes in a radially outward direction from the outer radius of the center body 116. In this configuration, the wide end 210 is allowed to flex in a radially inward direction and displace into an aperture defined in the center body 116 if force is applied to the tab 202; more specifically, if a downward and/or inward force is applied to the sloped surface 206 of the tab 202.

The lower retainer 110 may also include, as shown in the depicted embodiment, a lower tab 212 configured to couple the lower retainer 110 to the vehicle panel 114. Similar to the tab 202 coupling the lower retainer 110 to the upper retainer 104, the lower tab 212 may include a lower narrow end 214 and a lower wide end 216, wherein the lower wide end 216 is allowed to flex in a radially inward direction and displace into an aperture defined in the center body 116 if force is applied to the lower tab 212; more specifically, if an upward and/or inward force is applied to a lower sloped surface 218 of the lower tab 212.

The upper retainer 104 further includes an inner flange 220 disposed around an inner radius of the cylindrical portion 106 and protruding in an inward direction. The wide end 210 of the tab 202 engages with the inner flange 220 to couple the upper retainer 104 to the lower retainer 110. In an exemplary embodiment, the carpet 112 is disposed between the upper flange 108 of the upper retainer 104 and a lower flange 204 of the lower retainer 110. The lower retainer 110 further includes a washer 222 in the disclosed embodiment that is positioned on a surface of the lower flange 204. The washer 222 is disposed between the lower flange 204 and the vehicle panel 114.

Figure 3:
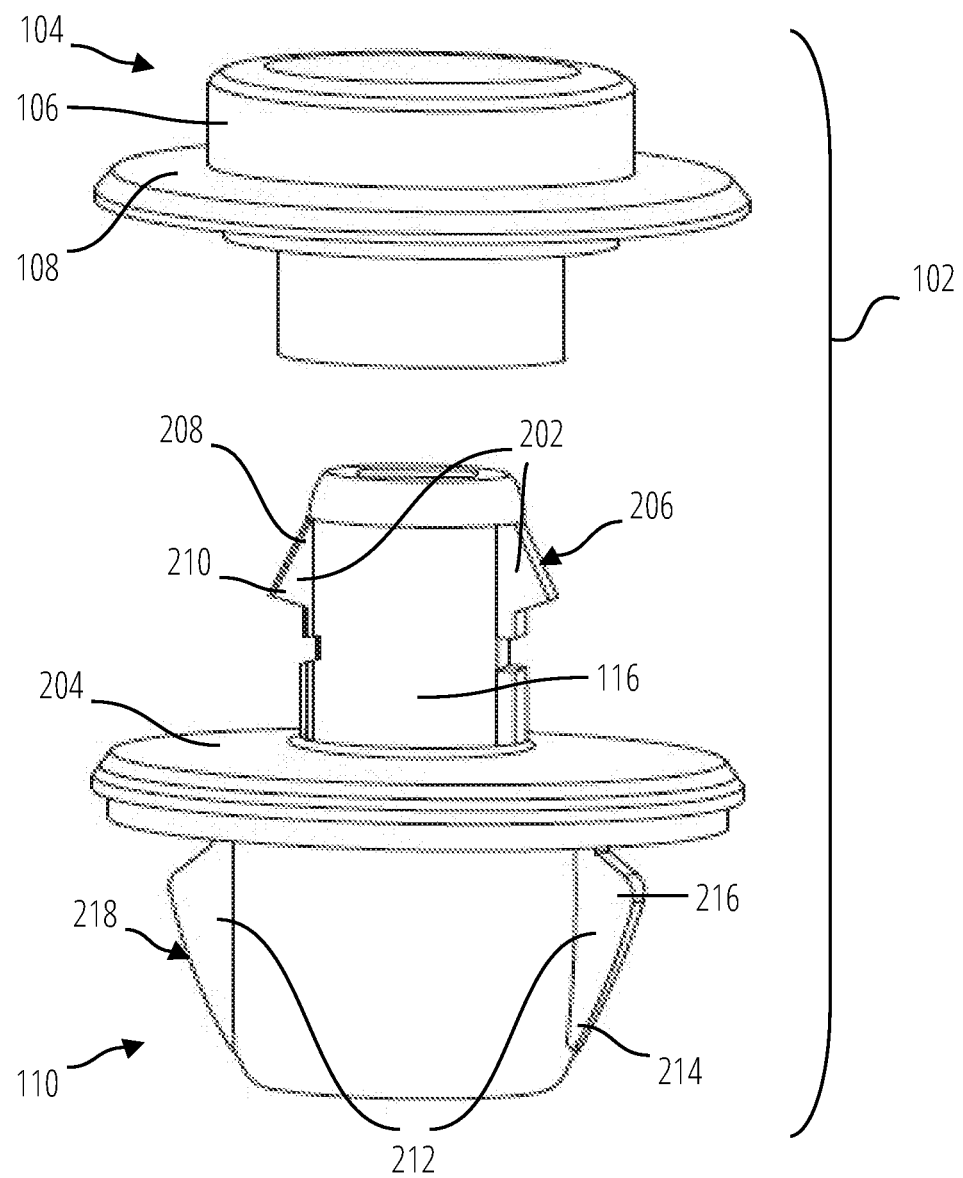
FIG. 3 is an exploded view of a retainer according to an exemplary embodiment.

FIG. 3 is an exploded view of a retainer that may be, for example, the retainer 102 provided in FIG. 1 and FIG. 2, or a different embodiment comprising an upper retainer 104, lower retainer 110, and tab 202.

Figure 4:
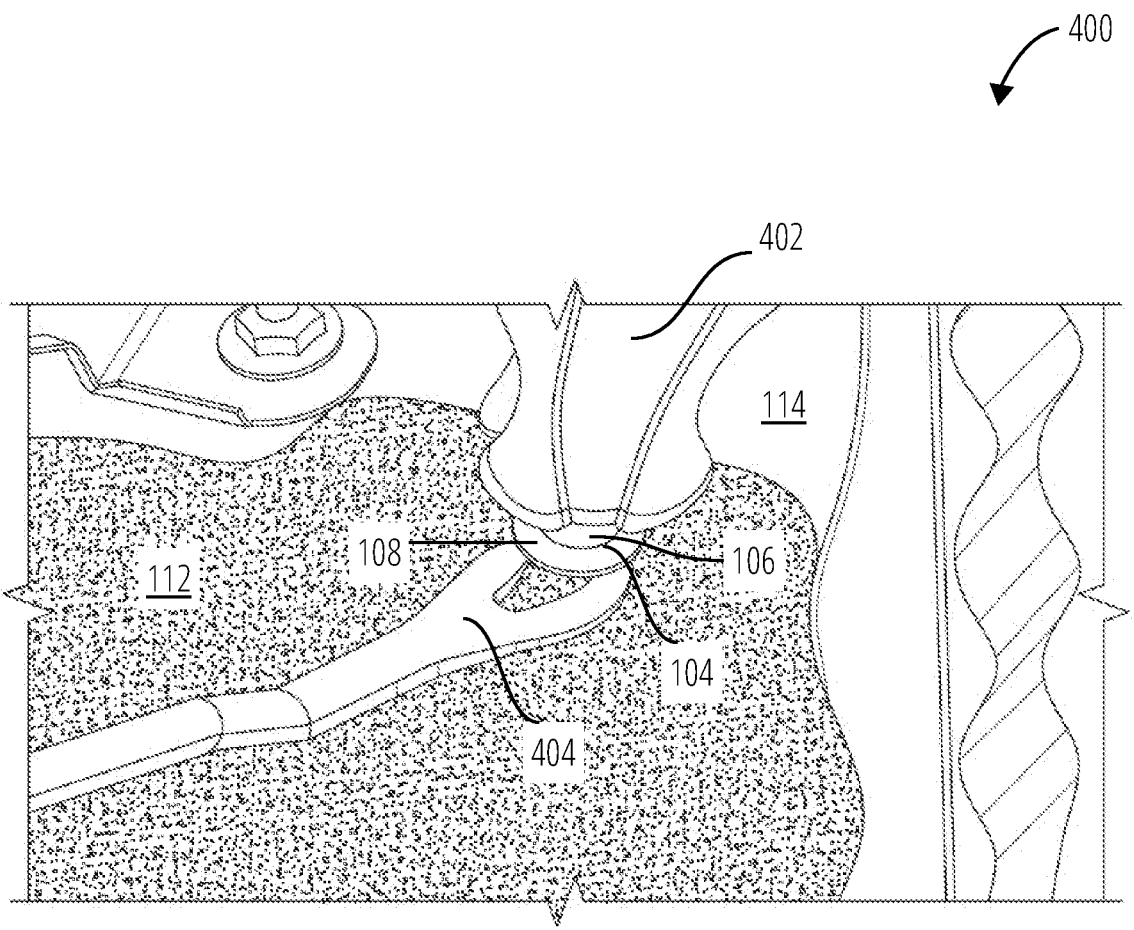
FIG. 4 is a perspective view of a carpet retainer system according to an exemplary embodiment provided in an exemplary environment.

FIG. 4 is a perspective view of a carpet retainer system 400 according to an exemplary embodiment and provided in an exemplary environment. As previously described with respect to FIG. 1 and further shown in FIG. 4, the exemplary environment may be an interior compartment of a vehicle wherein passengers and/or items are secured for transport. The carpet retainer system 400 removably couples a carpet 112 to a vehicle panel 114. The carpet retainer system 400 includes a retainer, a retainer removal tool 402, and a clip tool 404. The retainer may be the retainer 102 shown in FIG. 1 that includes the upper retainer 104 having the upper flange 108 and the lower retainer 110 having the lower flange 204 and a tab 202.

The retainer removal tool 402 is configured to engage and decouple the retainer 102. More specifically, the retainer removal tool 402 is configured to disengage the tab 202 from the inner flange 220, allowing separation of the upper retainer 104 from the lower retainer 110.

The clip tool 404 is configured to slide between the upper flange 108 and the carpet 112 and lift the upper flange 108 away from the carpet 112. The clip tool 404 includes a flat end having a fork shape and may be a metal material or a plastic material. The fork shape is configured to slide around the cylindrical portion 106 of the upper retainer 104 and allow the clip tool 404 to apply pressure to the upper flange 108. More specifically, the clip tool 404 is configured to apply pressure to the upper flange 108 in a direction away from the carpet 112 and the lower retainer 110.

Figure 5:
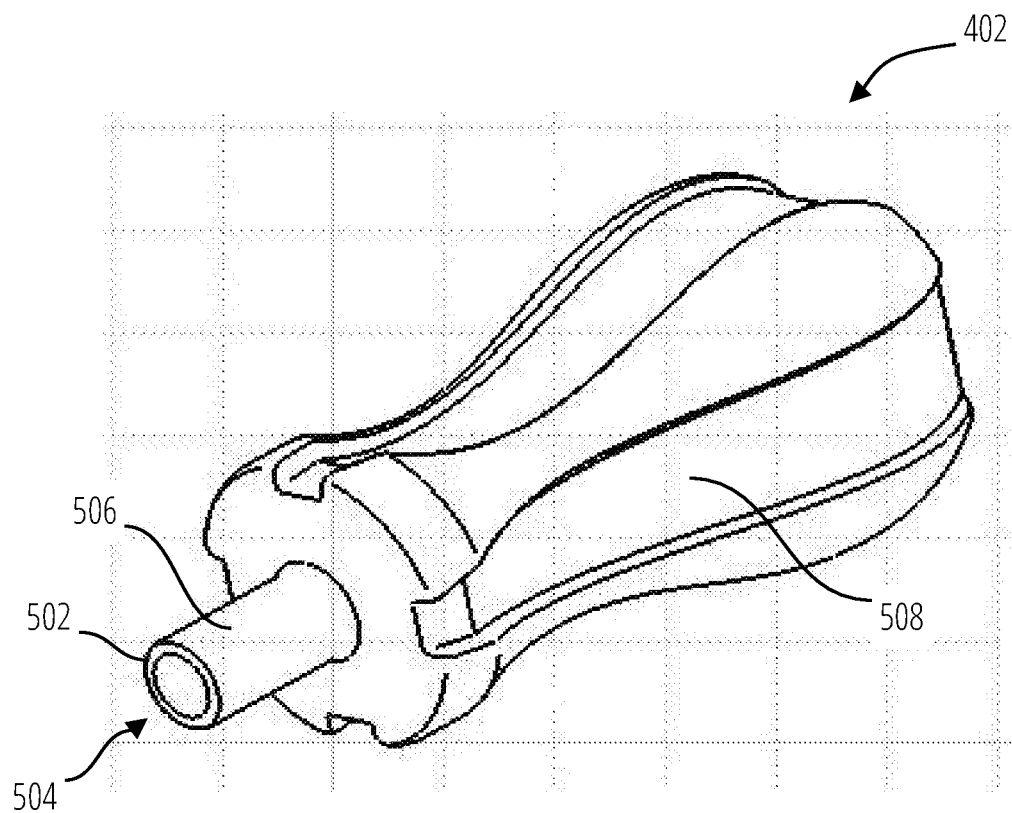
FIG. 5 is a perspective view of the retainer removal tool provided in FIG. 4.

FIG. 5 is a perspective view of a retainer removal tool. The retainer removal tool may be, for example, the retainer removal tool 402 provided in FIG. 4. An engagement tip 502 is disposed at a working end 504 of the shaft portion 506 that is opposite a handle portion 508. The handle portion 508 is configured to be held in a hand of a manufacturing associate. The shaft portion 506 is configured to slide around the center body 116 and within the cylindrical portion 106. The shaft portion 506 is also configured to disengage the tab 202; and more specifically the shaft portion 506 is configured to depress the tab 202 in a radially inward direction as the shaft portion 506 slides over the center body 116.

The retainer removal tool 402 may comprise a plastic material in an exemplary embodiment. More specifically, the handle portion 508 and the shaft portion 506 of the retainer removal tool 402 may comprise a plastic material. In an alternative embodiment, the handle portion 508 may comprise a plastic material and the shaft portion 506 may comprise a metal material. The plastic material of the handle portion 508 in the alternative embodiment may be configured to provide comfort to the manufacturing associate operating the retainer removal tool 402; the metal material of the shaft portion 506 may be configured to provide durability. In other embodiments, the handle portion 508 may be covered or coated in a gripping material such as rubber or leather to allow for more convenient operation if the manufacturing associate is wearing a glove, for example. Also, in other embodiments the shaft portion 506 may comprise a plastic material that has a higher hardness than the retainer 102.

The engagement tip 502 is a portion of the retainer removal tool 402 that is configured to engage the retainer 102. More specifically, the engagement tip 502 is configured to engage the sloped surface 206 of the tab 202. In the exemplary embodiment, the shaft portion 506 has a cylindrical cross-sectional profile and is hollow at the engagement tip 502 portion. The cylindrical profile of the shaft portion 506 is configured to correlate with the specific retainer 102 provided in the exemplary embodiment. However, in other embodiments the cross-sectional profile of the shaft portion, and more specifically the engagement tip, may comprise a different shape to correlate with the shape of a specific retainer.

Figure 6:
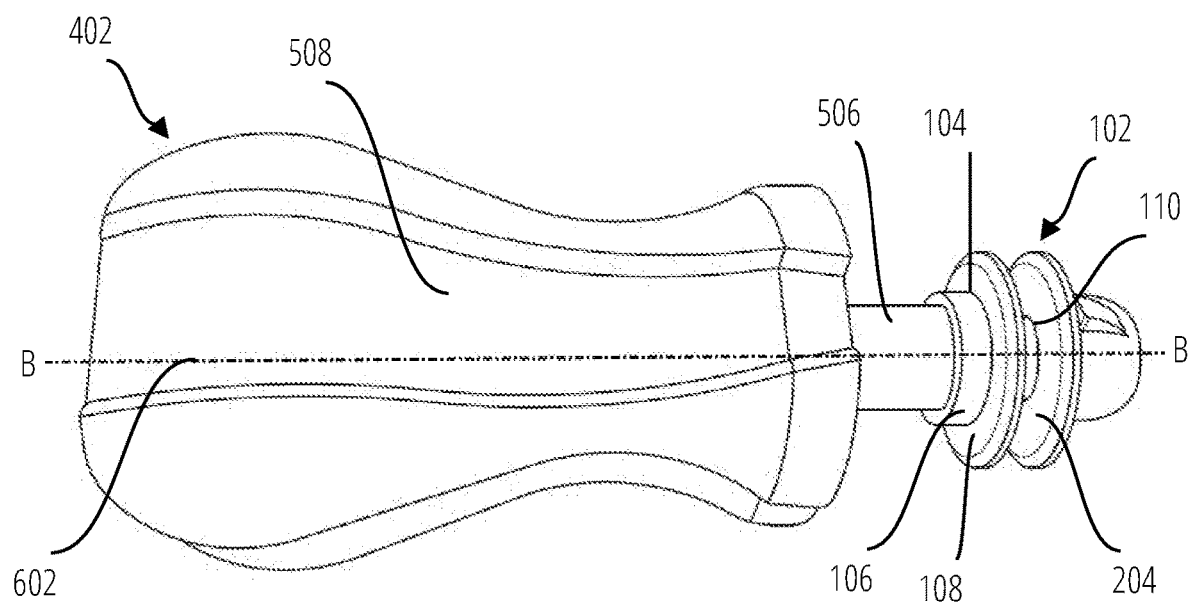
FIG. 6 is a side view of the retainer removal tool provided in FIG. 4 coupled to a retainer according to an exemplary embodiment.

FIG. 6 is a side view of the retainer removal tool 402 coupled to a retainer. The retainer may be, for example, the retainer 102 provided in FIG. 1 and FIG. 2, or a different embodiment comprising an upper retainer 104, lower retainer 110, and tab 202. With the retainer removal tool 402 coupled to the retainer 102, the shaft portion 506, and more specifically the engagement tip 502, is disposed within the cylindrical portion 106 of the upper retainer 104.

Figure 7:
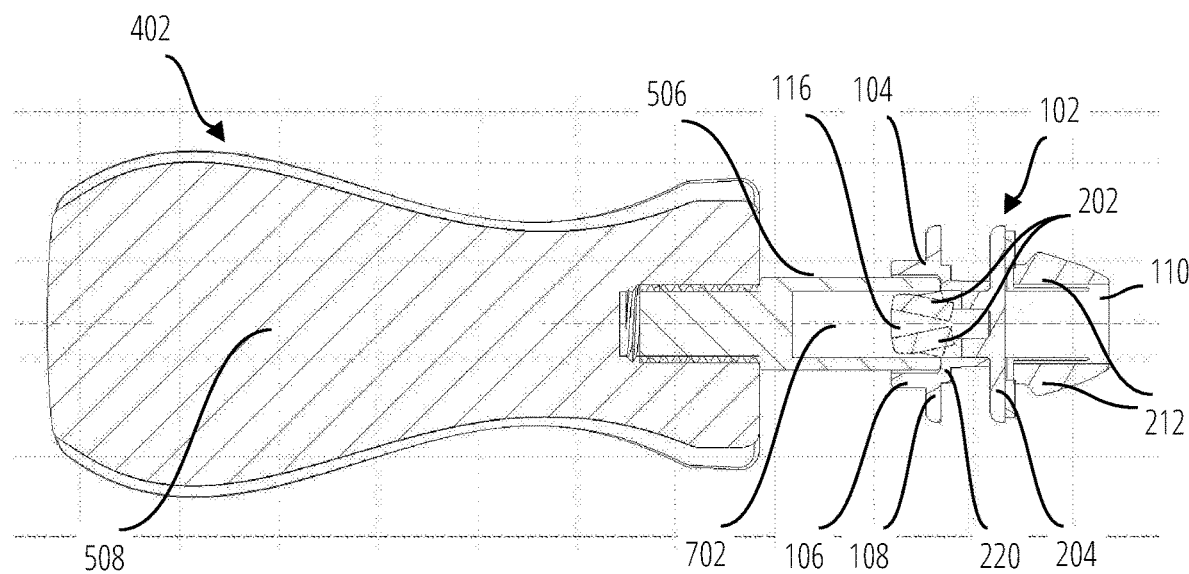
FIG. 7 is a sectional view of the retainer removal tool coupled to a retainer as provided in FIG. 6.

FIG. 7 is a sectional view of the retainer removal tool 402 coupled to the retainer 102 as provided in FIG. 6. The sectional view is taken along line B-B 602 shown in FIG. 6. The shaft portion 506 further includes a cavity 702 defined therein that extends over half the length of the shaft portion 506. With the retainer removal tool 402 coupled to the retainer 102, the shaft portion 506 is disposed around the center body 116. In other words, the center body 116 is disposed within the cavity 702 of the shaft portion 506. Further, the walls defining the cavity 702 are configured to depress each of the tabs 202 in a radially inward direction into the center body 116. With the tabs 202 depressed into the center body 116, they no longer engage with the inner flange 220, thus allowing the upper retainer 104 to decouple from the lower retainer 110.

Another embodiment of a retainer removal tool may be used to decouple a lower tab from a vehicle panel. For example, the lower tab 212 and vehicle panel 114 shown in FIG. 2. In this configuration, the inner flange 220 is substituted with an edge defining a through-hole in the vehicle panel 114 to which each of the lower tabs 212 engages. Additionally, in this configuration the lower retainer 110 decouples from the vehicle panel 114 rather than the upper retainer 104. Decoupling the lower tab 212 from the vehicle panel 114 allows the entire retainer 102, and carpet 112 if disposed therebetween, to be removed from the vehicle panel 114. As configured for this purpose, the retainer removal tool may include a short handle and shaft to allow for more convenient operation on an opposing side of the vehicle panel 114 as the upper retainer 104 and carpet 112. This opposing side of the vehicle panel is often disposed in a vehicle location having limited workspace, thus benefiting from a retainer removal tool that has a small and/or short profile.

Figure 8:
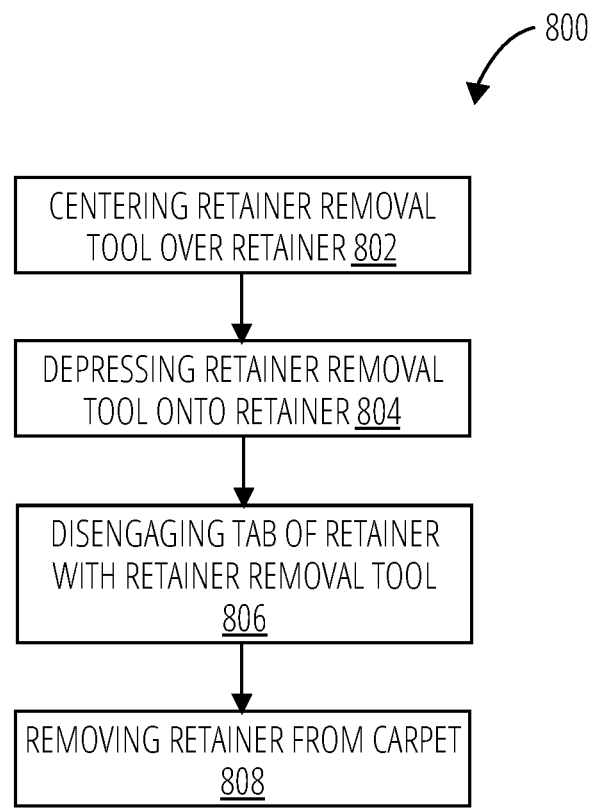
FIG. 8 is a flowchart illustrating a method for removing a retainer according to an exemplary embodiment.

FIG. 8 is a flowchart illustrating a method 800 for removing a retainer. The exemplary embodiment includes a retainer and a retainer removal tool; for example the retainer 102 and retainer removal tool 402 described herein. The method 800 includes centering 802 the retainer removal tool 402 over the retainer 102, depressing 804 the retainer removal tool 402 onto the retainer 102, disengaging 806 a tab 202 of the retainer 102 with the retainer removal tool 402, and removing 808 the retainer 102 from the carpet.

Centering 802 the retainer removal tool 402 over the retainer 102 may include aligning the engagement tip 502 of the retainer removal tool 402 with the cylindrical portion 106 of the upper retainer 104. As previously described, the engagement tip 502 is configured to slide around a center body 116 of the lower retainer 110 and within the cylindrical portion 106 of the upper retainer 104.

Depressing 804 the retainer removal tool 402 onto the retainer 102 includes pushing the handle portion 508 towards the retainer 102 to cause the shaft portion 508 to slide over the center body 116 and within the cylindrical portion 106.

Disengaging 806 the tab 202 of the retainer 102 with the retainer removal tool 402 may include contacting the tab 202 with the engagement tip 502. In an alternative embodiment, disengaging 806 the tab 202 may include decoupling the tab 202 that is located on the lower retainer 110 from the upper retainer 104. In a further embodiment, disengaging the tab 202 may include depressing the tab 202 in a radially inward direction. More specifically, disengaging 806 the tab 202 may include pushing the tab 202 in a radially inward direction as the engagement tip 502 slides downward along the sloped surface 206.

Removing 808 the retainer 102 from the carpet includes separating the upper retainer 104 from the lower retainer 110. In an alternative embodiment, removing 808 the upper retainer 104 includes pulling the upper retainer 104 away from the carpet using the clip tool 404. For example, if the carpet laying on a horizontal plane, pulling the upper retainer 104 away includes lifting the clip tool 404 vertically away from the carpet with the upper retainer 104 disposed thereupon.

In an alternative embodiment, the method may further include inserting a clip tool, for example the clip tool 404 described herein, between the retainer 102 and the carpet. More specifically, inserting the clip tool 404 includes sliding a flat portion of the clip tool 404 between the upper flange 108 of the upper retainer 104 and the carpet. In an alternative embodiment, inserting the clip tool 404 may include sliding a fork-shaped portion of the clip tool 404 around the cylindrical portion 106 of the upper retainer 104. Inserting the clip tool 404 may occur at any point prior to removing 808 the retainer 102.

The foregoing detailed description of exemplary embodiments is included for illustrative purposes only. It should be understood that other embodiments could be used, or modifications and additions could be made to the described embodiments. Therefore, the disclosure is not limited to the embodiments shown, but rather should be construed in breadth and scope in accordance with the recitations of the appended claims.

What is claimed is:

1. A carpet retainer system for a vehicle, comprising:
    a retainer that includes:
        an upper retainer comprising a cylindrical portion and an upper flange; and
        a lower retainer comprising a center body and a lower flange and coupled to the upper retainer with a tab that is depressible and disposed on the center body; and
    a retainer removal tool that includes:
        a shaft portion that is engageable with the tab; and
        a handle portion; and
    wherein the center body is disposed within the cylindrical portion, and the shaft portion is configured to slide around the center body and within the cylindrical portion.

2. The carpet retainer system of claim 1, wherein the shaft portion has a cylindrical shape.

3. The carpet retainer system of claim 1, wherein the shaft portion includes an engagement tip that has a hollow cylindrical shape that is configured to depress the tab of the retainer in a radially inward direction.

4. The carpet retainer system of claim 1, wherein the upper flange and the lower flange are configured to be retain a carpet therebetween.

5. The carpet retainer system of claim 4, further comprising a clip tool that is configured to slide around a cylindrical portion of the upper retainer and between the carpet and the upper flange.

6. The carpet retainer system of claim 1, wherein each of the retainer and the retainer removal tool comprises a plastic material.

7. The carpet retainer system of claim 6, wherein the shaft portion comprises a metal material.

* * * * *